(12) United States Patent
Cryer et al.

(10) Patent No.: US 10,358,035 B2
(45) Date of Patent: Jul. 23, 2019

(54) SYSTEM AND METHOD FOR POWERING A HYDRAULIC PUMP

(71) Applicant: General Electric Company, Schenectady, NY (US)

(72) Inventors: Robert Douglas Cryer, Erie, PA (US); George Wnukoski, Erie, PA (US); David Kamensky, West Chester, OH (US); Ramesh Krishnan, Mississauga (CA); William Halli, Lawrence Park, PA (US); Alexey Gaev, Erie, PA (US); Ryan Martorella, Erie, PA (US); Tarun Shivlani, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/411,129

(22) Filed: Jan. 20, 2017

(65) Prior Publication Data

US 2017/0129338 A1    May 11, 2017

Related U.S. Application Data

(62) Division of application No. 14/641,422, filed on Mar. 8, 2015, now Pat. No. 9,579,980, which is a division
(Continued)

(51) Int. Cl.
*B60K 17/28* (2006.01)
*B60K 6/48* (2007.10)
(Continued)

(52) U.S. Cl.
CPC .............. *B60L 1/003* (2013.01); *B60K 1/04* (2013.01); *B60K 6/485* (2013.01); *B60L 11/12* (2013.01);
(Continued)

(58) Field of Classification Search
CPC .......... B60K 17/28; B60K 6/48; B60K 6/485; B60L 11/02; B60L 11/12; B61C 7/00
See application file for complete search history.

(56) References Cited

U.S. PATENT DOCUMENTS

| 7,338,335 B1* | 3/2008 | Messano | B60G 13/14 180/65.22 |
| 2007/0204991 A1* | 9/2007 | Loree | C09K 8/64 166/280.1 |
| 2013/0186268 A1* | 7/2013 | Hill | B01D 53/263 95/10 |

* cited by examiner

*Primary Examiner* — Bryan A Evans
(74) *Attorney, Agent, or Firm* — GE Global Patent Operation; John A. Kramer

(57) ABSTRACT

A hydraulic pump powering system includes a mobile vehicle, a first electric current generator device, and one or more electric pump motors. The mobile vehicle has first and second prime movers. The first electric current generator device is disposed onboard the mobile vehicle and is configured to be mechanically coupled with the first prime mover to convert movement created by the first prime mover into first electric current. The one or more electric pump motors are configured to receive the first electric current to power a hydraulic pump. The second prime mover is configured to generate movement that is converted into a propulsive force that propels the mobile vehicle. The one or more electric pump motors are configured to receive the first electric current in order to power the hydraulic pump to pump a fluid into a pumping location located off-board the mobile vehicle.

20 Claims, 8 Drawing Sheets

Related U.S. Application Data of application No. 13/541,980, filed on Jul. 5, 2012, now Pat. No. 8,997,904.

(51) Int. Cl.
*B60K 11/02* (2006.01)
*B60L 11/12* (2006.01)
*B61C 7/00* (2006.01)
*B60L 1/00* (2006.01)
*F04B 17/03* (2006.01)
*F04B 17/06* (2006.01)
*F04B 47/02* (2006.01)
*B60K 6/485* (2007.10)
*B60K 1/04* (2019.01)
*H02P 9/42* (2006.01)
*H02K 7/18* (2006.01)
*H02P 27/06* (2006.01)
*E21B 43/26* (2006.01)

(52) U.S. Cl.
CPC .............. *F04B 17/03* (2013.01); *F04B 17/06* (2013.01); *F04B 47/02* (2013.01); *H02K 7/1815* (2013.01); *H02K 7/1823* (2013.01); *H02P 9/42* (2013.01); *H02P 27/06* (2013.01); *E21B 43/26* (2013.01)

SYSTEM AND METHOD FOR POWERING A HYDRAULIC PUMP

CROSS-REFERENCE TO RELATED APPLICATIONS

This application is a divisional of, and claims priority to, U.S. patent application Ser. No. 14/641,422, filed 8 Mar. 2015, which is a divisional of U.S. patent application Ser. No. 13/541,980, filed 5 Jul. 2012 and issued as U.S. Pat. No. 8,997,904 on 7 Apr. 2015, the entire disclosure of which is incorporated herein by reference.

FIELD

Embodiments of the inventive subject matter described herein relate to powering hydraulic pumps.

BACKGROUND

Hydraulic pumps are used to pump fluids from one location to another. For example, hydraulic pumps may be used in hydraulic fracturing to pump fracturing fluid ("fracking fluid") into a well and beneath the surface of the earth to extract resources such as natural gas from within the earth. In another example, cement pumps can be used for a variety of other pressure pumping services, such as pumping cement to a location where the cement is used to form a structure, provide an anchor or secure a casing of a bore that goes into a well, and the like. Other types of pumps, such as mud pumps that carry lubricant to flush drill cuttings from a well, also may be used.

Known systems used to power these hydraulic pumps include mechanical transmissions that mechanically couple a prime mover with the hydraulic pumps. For example, some known systems include a diesel engine as the prime mover, which creates rotational power or movement. This power or movement is transferred through a manual or automatic mechanical and/or hydraulic transmission that includes one or more shafts, gears, pinions, or the like, that are coupled with the diesel engine or other prime mover. The mechanical transmission changes the speed and/or torque of the rotational movement created by the prime mover.

The mechanical transmission also is mechanically coupled with the hydraulic pump by one or more gears, shafts, pinions, or the like. The rotational movement from the prime mover that is modified by the mechanical transmission is provided to the hydraulic pump, such as by coupling an output shaft of the mechanical transmission with the pump to cause the pump to reciprocate (or other means of positive displacement) and force a fluid from one location to another (e.g., into a well).

At least one shortcoming of using such a mechanical transmission is that the mechanical components of the transmission may be limited in how much power can be transferred from the prime mover to the hydraulic pump. Some known mechanical transmissions are limited in the power that can be provided to the hydraulic pumps due to design limitations on the gears, pinions, shafts, torque converters, and the like, that are restricted based upon available space for the mechanical transmissions, gear ratios of the mechanical transmissions, or the like. For example, some known mechanical transmissions that couple a shaft connected with a diesel engine to one or more gears for powering a hydraulic pump may be able to provide up to 2250 or 2500 horsepower (HP), but not in excess of these amounts. The volume of fluid that is pumped by the hydraulic pump (e.g., the fluid flow) is based on this HP that is used to power the hydraulic pump. As a result, the volume of fluid that can be pumped by the hydraulic pump can be limited.

One attempted solution to increase the amount of fluid flow that is provided by the hydraulic pumps is to fluidly couple several hydraulic pumps that are powered by different systems together so that the cumulative flow of the fluid that is generated by the hydraulic pumps is increased. Given the large sizes of the mechanical transmissions and the limits on power that can be provided by the mechanical transmissions, however, a relatively large number of such mechanical transmissions and the vehicles that carry the transmissions may be needed to supply adequate power to the hydraulic pumps. As a result, many of these vehicles, transmissions, and pumps may need to be located in relatively close proximity at a pumping location (e.g., wellhead) which can create a large degree of congestion at or near the pumping location.

BRIEF DESCRIPTION

In one embodiment, another hydraulic pump powering system includes a mobile vehicle, a first electric current generator device, and one or more electric pump motors. The mobile vehicle has first and second prime movers. The first electric current generator device is disposed onboard the mobile vehicle and is configured to be mechanically coupled with the first prime mover to convert movement created by the first prime mover into first electric current. The term "coupled" (and forms thereof) can include a direct coupling between two components or objects, or an indirect coupling between the two components, with one or more intermediate components disposed therebetween. The term "electric current" can include one or more forms of electric energy, such as direct current or voltage, alternating current (having fixed or variable frequencies), an electric data signal, or other electric output. The one or more electric pump motors are configured to receive the first electric current to power a hydraulic pump. The second prime mover is configured to generate movement that is converted into a propulsive force that propels the mobile vehicle and the one or more electric pump motors are configured to be powered by the first electric current in order to power the hydraulic pump to pump a fluid into a pumping location located off-board the mobile vehicle.

In another embodiment, another hydraulic pump powering system includes a mobile vehicle, an electric current generator device, a control unit, one or more electric traction motors, and one or more electric pump motors. As used herein, the term "unit" includes a hardware and/or software system that operates to perform one or more functions. For example, a unit may include a computer processor, controller, or other logic-based device that performs operations based on instructions stored on a tangible and non-transitory computer readable storage medium, such as a computer memory. Alternatively, a unit may include a hard-wired device that performs operations based on hard-wired logic of the device. The units shown in the attached figures may represent the hardware that operates based on software or hardwired instructions, the software that directs hardware to perform the operations, or a combination thereof.

The mobile vehicle includes a prime mover. The electric current generator device is disposed onboard the mobile vehicle and is mechanically coupled with the prime mover. The electric current generator device is configured to convert movement of the prime mover into a first electric current. The control unit is disposed onboard the mobile vehicle and is configured to convert the first electric current from the electric current generator device into a modified electric current. The control unit may automatically operate and/or may be controlled by manual inputs. The one or more electric traction motors are coupled with at least one of axles or wheels of the mobile vehicle. The one or more electric traction motors are configured to propel the mobile vehicle. The one or more electric pump motors are disposed onboard the mobile vehicle and are configured to power a hydraulic pump to pump a fluid into a pumping location disposed off-board the mobile vehicle. The control unit is configured to control when the modified electric current is supplied to the one or more electric traction motors to propel the mobile vehicle and when the modified electric current is supplied to the one or more electric pump motors to power the hydraulic pump.

In another embodiment, another hydraulic pump powering system includes a mobile vehicle, an electric current generator device, one or more electric pump motors, one or more electric traction motors, and a control unit. The electric current generator device is mechanically coupled with a prime mover of the mobile vehicle to generate electric current. The one or more electric pump motors are disposed on board the vehicle and are configured to receive the electric current and to power a hydraulic pump using the electric current. The one or more electric traction motors are disposed on board the vehicle and are configured to receive the electric current to propel the vehicle. The control unit is disposed onboard the vehicle and is configured to control a frequency of the electric current that is supplied to the one or more electric pump motors in order to control flow of a fluid that is pumped into a pumping location disposed off-board of the vehicle by the hydraulic pump.

In another embodiment, a method (e.g., for powering a hydraulic pump) includes converting movement of a prime mover disposed onboard a mobile vehicle into an electric current, directing the electric current to one or more electric traction motors of the vehicle to propel the vehicle during a first time period, and directing the electric current to one or more electric pump motors disposed onboard the mobile vehicle to power the hydraulic pump disposed off-board the vehicle during a second time period. The electric current is directed to the one or more electric pump motors to pump a fluid into a pumping location that is disposed off-board the mobile vehicle.

BRIEF DESCRIPTION OF THE DRAWINGS

Reference is now made briefly to the accompanying drawings, in which.

DETAILED DESCRIPTION

Figure 1:
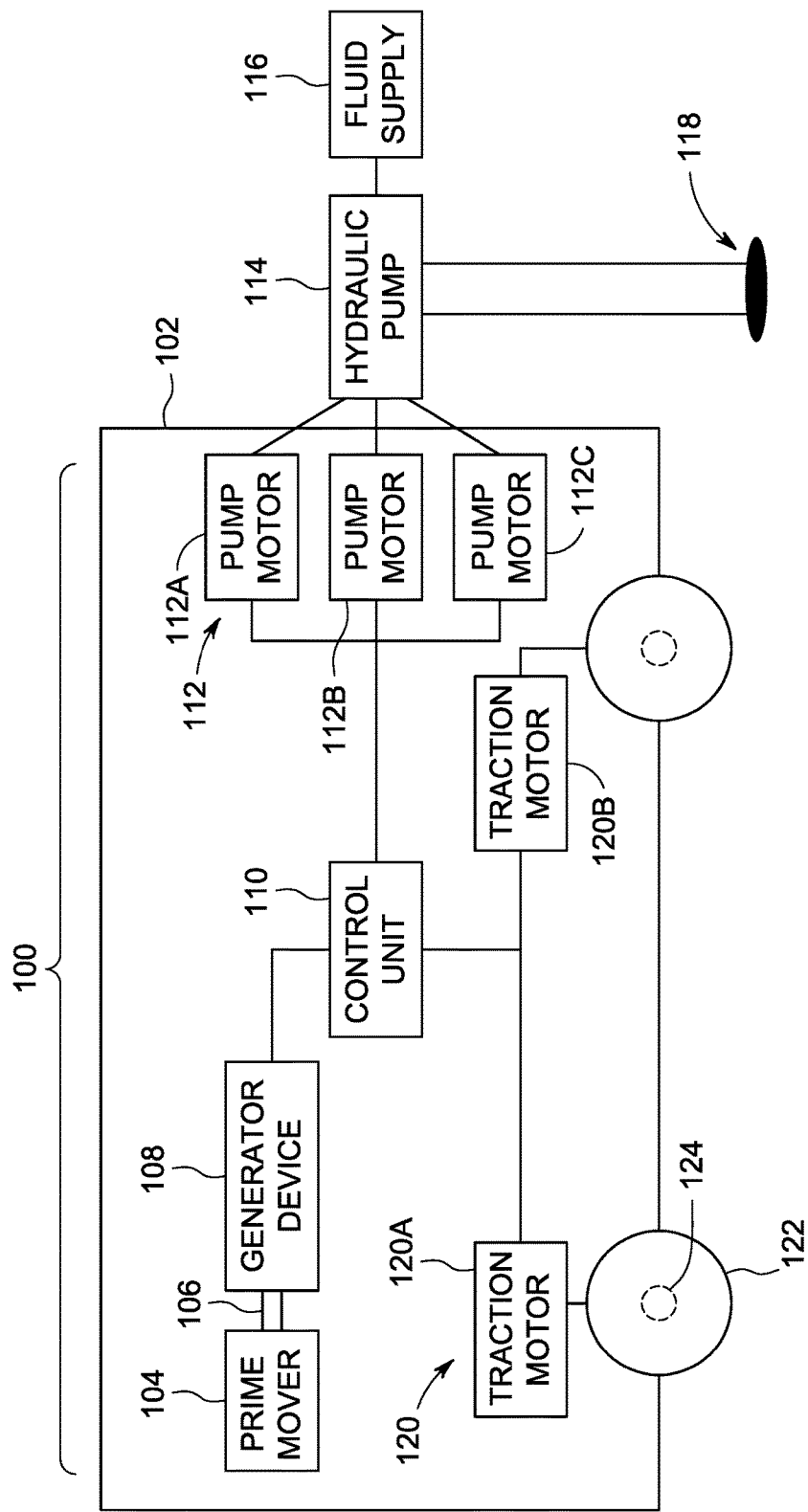
FIG. 1 is a schematic view of one embodiment of a mobile hydraulic pump powering system.

In accordance with one or more embodiments described herein, a hydraulic pump powering system is provided that includes a power source that generates or provides electric energy (e.g., such as electric current, which can include direct current and/or alternating current, an electric signal, or other electric output), electric power transmission or conversion components that modify the electric current (e.g., increase or decrease voltage, modify a frequency of the current, and the like), and pumps that are used to deliver pressurized fluids for one or more purposes, such as hydraulic fracturing, well stimulation, and the like. As one example, the power source can include a prime mover such as an internal combustion engine or gas turbine that rotates and produces torque at a controllable speed. In one embodiment, the prime mover includes a turbine that is powered by natural gas. Alternatively, the prime mover can include another device, such as an internal combustion engine. The power transmission components may be electronic components, such as electric alternators or generators that produce electric power (e.g., alternating current having fixed or variable frequency or direct current, such as a voltage) that is directed to a variable-frequency drive, which can modify the current and deliver the modified current to drive one or more electric motors. The electric motors can be mechanically coupled with one or more hydraulic pumps (e.g., reciprocating pumps, positive-displacement pumps, or other pumps) to power the pumps and force highly pressurized fluids, mixtures, gels, and the like, for fracturing or other stimulation of a well that extends into the earth for opening geological formations to extract one or more resources, such as natural gas, oil, and the like. Additionally or alternatively, the systems may power pumps that deliver other fluids to an area, such as cement pumps that supply cement to a building location or drilling location, mud pumps that deliver slurries, mud, and the like, or other pumps.

The use of electric transmissions and electric pump motors can reduce the space consumed by the systems that power a hydraulic pump. For example, the electric transmissions and pump motors described herein can provide the same or greater power to a hydraulic pump as mechanical transmissions (e.g., systems that use gears, pinions, and the like, to translate mechanical movement from a prime mover into mechanical movement that powers the hydraulic pump) while taking up less space at a pumping location, such as a wellhead. Additionally, the systems described herein can be combined to increase the power supplied to the hydraulic pump while taking up less space at the pumping location than multiple combined systems that use mechanical transmissions.

The use of electric transmissions and electric pump motors can reallocate the distribution of equipment at or near a wellhead. For example, the prime movers that generate movement used to create electric current and/or the generators or alternators that create the electric current can be disposed farther from the wellhead relative to hydraulic or mechanical systems. As a result, other equipment can be moved to the locations previously occupied by the prime movers and mechanical transmissions.

Removing the mechanical transmission that translates movement between the engine and the hydraulic pump also can reduce or eliminate the mechanical limitations on the power that can be provided to the hydraulic pump to pump the fluid at the pumping location. For example, discrete gear ratios used in the mechanical transmission may no longer be required and a more continuous power output may be provided by the electrically powered pump motors. With some prime movers (e.g., diesel engines as one example), the amount of HP that can be generated may be significant. Electrically transferring the energy generated by these prime movers to electric pump motors that power a hydraulic pump can eliminate or increase the limitations on the amount of HP that is transferred to the hydraulic pump for powering the pump. For example, the HP that can be provided to the hydraulic pump by a single prime mover and via an electrical transmission may be in excess of 2500 HP. As one example, the HP can be increased up to 2700 HP. In another embodiment, the HP can be increased up to 3000 HP. In yet another embodiment, the HP can be increased up to 3500 HP. Alternatively, another HP may be provided, such as a HP that is greater, below, or between one or more of the preceding enumerated HP.

FIG. 1 is a schematic view of one embodiment of a hydraulic pump powering system 100. The system 100 may be disposed onboard a mobile vehicle 102 that is capable of propelling itself such that the system 100 can be moved between a variety of different locations. Alternatively, the system 100 may be disposed onboard a trailer that is coupled with the mobile vehicle 102 that pulls or pushes the trailer between the different locations. For example, the vehicle 102 may represent a truck pulling a trailer with the system 100 disposed onboard the truck and/or trailer. As used herein, the term "vehicle" can refer to the component that includes the propulsion subsystem (e.g., the engine, motors, and the like) that propel the vehicle (e.g., the truck, automobile, or the like) and/or the combination of the component that includes the propulsion subsystem and a trailer that is coupled thereto and on which the system 100 is disposed. Alternatively, the vehicle 102 may represent another type of vehicle, such as a rail vehicle, a marine vessel, another off-highway vehicle, or other type of vehicle.

In the illustrated embodiment, the system 100 includes or is joined with a prime mover 104. The prime mover 104 includes one or more assemblies that convert energy from one form to another, such as an engine (e.g., an internal combustion engine) or turbine (e.g., a turbine powered by natural gas) that converts stored energy from fuel into movement (e.g., rotation) of a shaft 106. The prime mover 104 can represent an internal combustion engine that rotates the shaft 106 and produces torque at an engine speed. The engine of the prime mover 104 can be a reciprocating engine (e.g., that uses compression ignition, spark ignition, and the like), a rotating turbine design, an external combustion engine (e.g., steam engine), an internal combustion engine (e.g., reciprocating piston design, rotating turbine design, and the like), or another type of engine. In another embodiment, the prime mover 104 may not be disposed onboard the vehicle. For example, the prime mover 104 may be disposed onboard another vehicle and coupled with the system 100.

The prime mover 104 is connected with an electric power transmission subsystem that converts the movement generated by the prime mover 104 into electric energy (e.g., current) that powers one or more electric pump motors 112 (e.g., pump motors 112A-C). The electric power transmission subsystem includes an electric current generator device 108 that converts movement created by the prime mover 104 into electric current. For example, the generator device 108 of the system 100 may include or represent a generator that creates direct current from rotation of the shaft 106, an alternator that creates alternating current from rotation of the shaft 106, or another device that generates electric current based on movement created by the prime mover 104. In one embodiment, the generator device 108 can be a self-excited, field-excited, or other alternator or generator.

The electric current created by the prime mover 104 and the generator device 108 is supplied to control unit 110. Alternatively or additionally, a power storage device, such as one or more batteries, fuel cells, and the like, may be used in addition to or in place of the prime mover 104 and generator device 108 to supply the electric current to the control unit 110. For example, the combination of the prime mover 104 and the generator device 108 may represent an onboard power storage device that supplied electric current to the control unit 110.

The control unit 110 receives the electric current created by the generator device 108 and modifies the electric current. The control unit 110 can modify the electric current by changing one or more characteristics of the current, such as a frequency of the current, a voltage, and the like. For example, in one embodiment, the control unit 110 may receive a direct current (e.g., having zero frequency) from the generator device 108. The control unit 110 may increase or decrease the voltage of the direct current (e.g., using one or more transformers and the like) and/or convert the direct current into an alternating current having a designated number of phases, a designated frequency, and/or a designated power. An alternator may be included in the control unit 110 to change the direct current received from the generator device 108 into an alternating current, for example.

The control unit 110 may then convert the alternating current into a second direct current. For example, the control unit 110 may include one or more inverters that convert the alternating current created by the alternator into a second direct current. This second direct current may differ from the first direct current that is created by the generator device 108. For example, the second direct current from the inverters may have a different energy (e.g., voltage) or other electric characteristic than the first direct current from the generator device 108.

The control unit 110 may then again modify this second direct current into another alternating current, such as a variable frequency alternating current. The variable frequency alternating current may have a frequency that is controlled by the control unit 110. The control unit 110 may vary the frequency of the alternating current in order to control the speeds at which one or more electric motors operate. For example, the variable frequency alternating current from the control unit 110 may be supplied to the electric motors to power the motors. The control unit 110 may increase the frequency of the variable frequency alternating current in order to increase the speed of the motors and/or decrease the frequency to decrease the speed of the motors. In one embodiment, the control unit 110 may vary the frequency of the alternating current based on manual input from an operator of the system 100. Additionally or alternatively, the control unit 110 may automatically control the frequency. For example, the control unit 110 may change the frequency over time to match one or more previously designated frequencies. The control unit 110 can automatically change the frequency in response to input provided by one or more sensors or other devices. For example, the control unit 110 may receive analog and/or digital input signals from sensors, such as pressure transducers that measure the pressure of the fluid being pumped by the system 100. The control unit 110 can automatically change the frequency of the current based on these input signals. As one example, if the input signal indicates that the pressure of the fluid being pumped has decreased below a designated threshold, the control unit 110 may increase the frequency of the current in order to increase the speed of the pump motors. Conversely, if the input signal indicates that the pressure has increased above a designated threshold (the same or a different threshold), the control unit 110 may decrease the frequency of the current to decrease the speed of the pump motors and/or turn off the pump motors.

In one embodiment, the generator device 108 outputs a direct current (e.g., a voltage) that is conveyed to a silicon-controlled rectifier (SCR) of the control unit 110. The SCR converts the voltage (e.g., by controlling when the voltage flows through the control unit 110) before supplying the voltage to the pump motors 112 that include DC motors. In another embodiment, the generator device 108 outputs an alternating current that is supplied to a rectifier of the control unit 110. The rectifier converts the alternating current into a direct current (e.g., a voltage) that is supplied to an SCR of the control unit 110. The SCR then controls the flow of the voltage to the pump motors 112 that include DC motors. In another embodiment, the generator device 108 outputs an alternating current that is supplied to a rectifier of the control unit 110. The rectifier converts the alternating current into a direct current (e.g., a voltage) that is supplied to an inverter of the control unit 110. The inverter converts the voltage into an alternating current that is supplied to a variable frequency device (VFD) of the control unit 110. The VFD controls the frequency of the alternating current that is then supplied to the pump motors 112.

The system 100 includes the pump motors 112 that receive the current that is output from the control unit 110. For example, the pump motors 112 may be conductively coupled with the control unit 110 by one or more conductive pathways (e.g., cables, buses, and the like). The current that is output from the control unit 110 may be referred to as modified current. While three pump motors 112 are shown, alternatively, the system 100 may include a different number of pump motors 112, such as a single pump motor 112, two pump motors 112, or four or more pump motors 112.

The control unit 110 can supply a relatively large amount of electric energy (e.g., direct current or voltage, alternating current having fixed or variable frequencies, and the like) to power the pump motors 112. For example, the control unit 110 can supply at least 700 kilowatts of electric power to the pump motors 112. As another example, the control unit 110 can supply at least 750 kilowatts to the pump motors 112. In another example, the control unit 110 can supply at least 1000 kilowatts to the pump motors 112. Alternatively, the control unit 110 can supply at least 1500 kilowatts to the pump motors 112. In another embodiment, the control unit 110 can supply at least 1850 kilowatts to the pump motors 112. The control unit 110 alternatively may supply a different electric power to the pump motors 112.

With respect to voltage, the control unit 110 can supply at least 400 volts to the pump motors 112. As another example, the control unit 110 can supply at least 600 volts to the pump motors 112. In another example, the control unit 110 can supply at least 690 volts to the pump motors 112. The control unit 110 alternatively may supply a different voltage to the pump motors 112.

The pump motors 112 can be mechanically coupled with one or more hydraulic pumps 114 in order to power the hydraulic pumps 114. For example, the pump motors 112 may be connected with the hydraulic pump 114 by one or more shafts, axles, or other components such that rotation of the pump motors 112 causes the hydraulic pump 114 to pump (e.g., force) fluid from a fluid supply 116 into a pumping location 118. The hydraulic pump 114 may be one or more of a variety of pumps, such as a reciprocating pump, a positive-displacement pump, or another pump.

In the illustrated embodiment, the hydraulic pump 114 is fluidly coupled with the fluid supply 116 that represents one or more containers of fluid. The hydraulic pump 114 can be powered by the pump motors 112 to load a fluid, such as fracturing fluid, mixture, or another fluid, from the fluid supply 116 into the pumping location 118 (e.g., via one or more conduits). The pumping location 118 can represent a wellhead of a well, such as an oil or gas well. The fluid may be pumped into the pumping location 118 to extract one or more resources from beneath the pumping location 118, such as natural gas from rock layers beneath the surface of the earth. Alternatively or additionally, the hydraulic pump 114 may be used to pump fluid out of the pumping location 118. The speed at which the pump motors 112 operate may be controlled by the frequency of the alternating current that powers the pump motors 112. For example, the pump motors 112 may be alternating current induction motors. Alternatively, the pump motors 112 may be permanent magnet motors, switched reluctance motors, a direct current motor, or another type of motors.

The hydraulic pump 114 can be powered by the pump motors 112 to pump a relatively large amount of fluid at the pumping location 118. For example, the hydraulic pump 114 can be powered by the pump motors 112 to pump fluid at a rate of at least two gallons (or 7.5 liters) per minute per revolution of the hydraulic pump 114. As another example, the hydraulic pump 114 can be powered by the pump motors 112 to pump fluid at a rate of at least 2.5 gallons (or 9.5 liters) per minute per revolution of the hydraulic pump 114. In another embodiment, the hydraulic pump 114 can be powered by the pump motors 112 to pump fluid at a rate of at least 2.75 gallons (or 10.4 liters) per minute per revolution of the hydraulic pump 114. Alternatively, the hydraulic pump 114 can be powered by the pump motors 112 to pump fluid at another rate.

The vehicle 102 may be sized to move in relatively close proximity to the pumping location 118 (e.g., within a few dozen or hundred feet or meters) in order to power the hydraulic pump 114 that is disposed at the pumping location 118. For example, the vehicle 102 may drive or otherwise move up to the hydraulic pump 114. An operator may couple the pump motors 112 disposed onboard the vehicle 102 with the hydraulic pump 114 so that the pump motors 112 can power the hydraulic pump 114.

In the illustrated embodiment, the control unit 110 also may be conductively coupled with one or more traction motors 120 (e.g., traction motors 120A, 120B) of the vehicle 102. While two traction motors 120 are shown, alternatively, a single traction motor 120 or more than two traction motors 120 may be provided onboard the vehicle 102. The traction motors 120 are connected with wheels 122 and/or axles 124 of the vehicle 102. The traction motors 120 may be powered by the modified current provided by the control unit 110 in order to rotate the axles 124 and/or wheels 122 of the vehicle 102 to cause the vehicle 102 to propel itself along a surface, such as the surface of the earth, a road, a waterway, a track, and the like. For example, at least some of the movement created by the prime mover 104 may be converted into electric energy (e.g., current) that is supplied to the traction motors 120 for generating a propulsive force that propels the vehicle 102 along a surface. The control unit 110 provides the modified current to both the pump motors 112 and the traction motors 120 in the illustrated embodiment to both power the hydraulic pump 114 and the propel the vehicle 102. The control unit 110 may include one or more switches, contactors, and the like, to control which motors 112, 120 receive the modified current. For example, when the vehicle 102 is moving toward the pumping location 118, the control unit 110 may supply the modified current to the traction motors 120 and not to the pump motors 112. When the vehicle 102 is at the pumping location 118, the control unit 110 may then supply the modified current to the pump motors 112 and not to the traction motors 120.

The system 100 shown in FIG. 1 may be able to power the hydraulic pump 114 to pump relatively large amounts of fluid. For example, a single mobile vehicle 102 having the system 100 disposed onboard the vehicle 102 and coupled with the hydraulic pump 114 may power the pump 114 to pump at least 200 gallons (or 757 liters) of fluid per minute. As another example, a single mobile vehicle 102 having the system 100 disposed onboard the vehicle 102 and coupled with the hydraulic pump 114 may power the pump 114 to pump at least 300 gallons (or 1,135 liters) of fluid per minute. In another embodiment, a single mobile vehicle 102 having the system 100 disposed onboard the vehicle 102 and coupled with the hydraulic pump 114 may power the pump 114 to pump at least 380 gallons (or 1,438 liters) of fluid per minute. Alternatively, a single mobile vehicle 102 having the system 100 disposed onboard the vehicle 102 and coupled with the hydraulic pump 114 may power the pump 114 to pump a different amount of fluid per minute.

Figure 2:
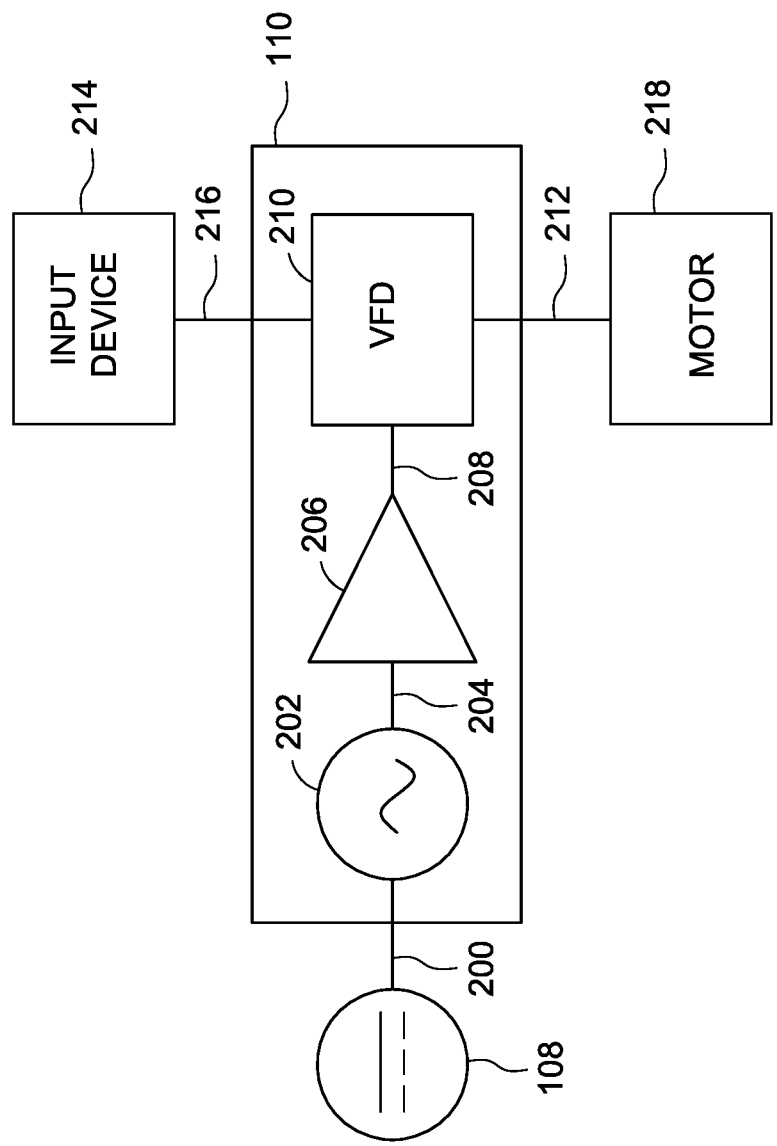
FIG. 2 is a circuit diagram of one embodiment of a control unit shown in FIG. 1.

FIG. 2 is a circuit diagram of one embodiment of the control unit 110 shown in FIG. 1. The control unit 110 can receive first direct current 200 from the generator device 108, as described above. An alternator 202 of the control unit 110 may receive the first direct current 200. The alternator 202 may convert this first direct current 200 into an alternating current 204 that is supplied to an inverter 206. The inverter 206 converts the alternating current 204 into a second direct current 208. The inverter 206 may generate the second direct current 208 to have a designated voltage. For example, the inverter 206 may be formed and/or connected with the alternator 202 such that the inverter 206 creates the second direct current 208 having a designated voltage or a voltage within a designated range, independent or regardless of the frequency and/or phases of the alternating current 204 received from the alternator 202.

A variable frequency device 210 of the control unit 110 receives the second direct current 208 from the inverter 206 and forms a variable frequency alternating current 212 from the second direct current 208. In one embodiment, the variable frequency device 210 represents or includes a variable frequency drive having one or more diodes, capacitors, inverters, and the like, that operate to convert the direct current 208 into the alternating current 212 having a designated frequency. The variable frequency device 210 may automatically change the direct current 208 to the variable frequency alternating current 212 by generating the alternating current 212 to have a designated frequency (e.g., predetermined or based on an input signal from a sensor) without manual input. Alternatively, the variable frequency device 210 may generate the alternating current 212 to have a frequency that is selected by an input device 214. The input device 214 can include a keyboard, touch screen, stylus, electronic mouse, microphone, wireless device, or other device that receives input from a human operator to control the frequency of the alternating current 212. For example, the input device 214 may be disposed onboard the vehicle 102 and receive the input from the operator disposed onboard the vehicle 102 (shown in FIG. 1) that indicates a designated frequency of the alternating current 212. The input device 214 can communicate a control signal 216 to the variable frequency device 210 that represents or includes this designated frequency.

As described above, the variable frequency alternating current 212 is supplied from the control unit 110 (e.g., from the variable frequency device 210) to an electric motor 218 to power the motor 218. The motor 218 shown in FIG. 2 may represent one or more of the pump motors 112 and/or traction motors 120 shown in FIG. 1. The speed at which the motor 218 operates can be controlled by changing the frequency of the alternating current 212 that powers the motor 218, also as described above. In another embodiment, the control unit 110 may generate a direct current that is supplied to the pump motors 112 to power the motors 112.

Figure 3:
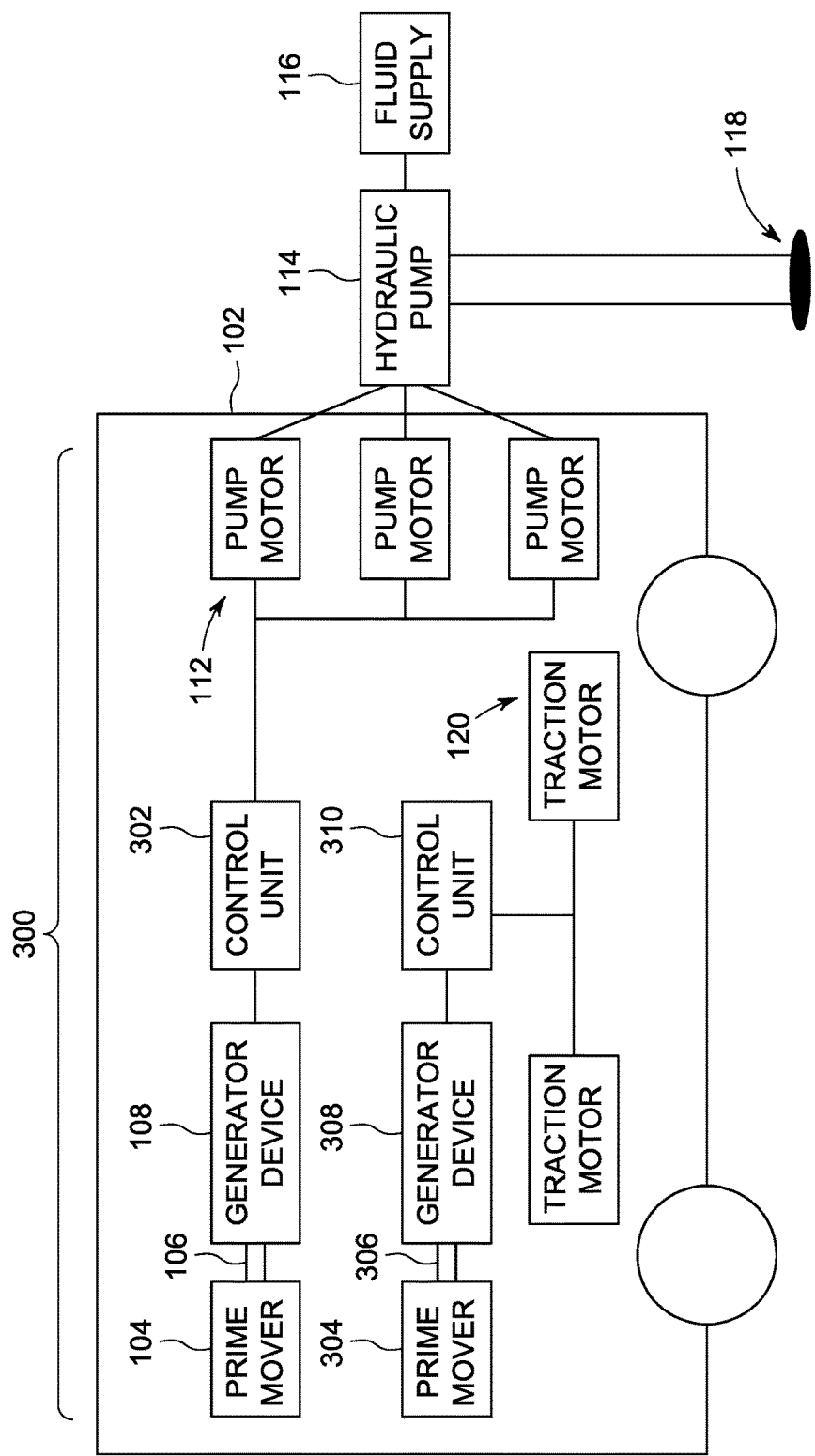
FIG. 3 is a schematic view of another embodiment of a mobile hydraulic pump powering system.

FIG. 3 is a schematic view of another embodiment of a hydraulic pump powering system 300. The system 300 may be similar to the system 100 shown in FIG. 1. For example, the system 300 may be disposed onboard the vehicle 102. Similar to the system 100, the system 300 may include the prime mover 104, shaft 106, and generator device 108 that are coupled with a control unit 302. The control unit 302 may be similar to the control unit 110 shown in FIG. 1 in that the control unit 302 may convert current received from the generator device 108 into a variable frequency alternating current that is supplied to the pump motors 112 for powering the hydraulic pump 114, as described above.

One difference between the control unit 302 of FIG. 3 and the control unit 110 of FIG. 1 is that the control unit 302 may not power the traction motors 120 of the vehicle 102. For example, the control unit 302 may be used to control the frequency of the alternating current used to power the motors 112 and, as a result, speed of the pump motors 112, but not the frequency of the current supplied to the traction motors 120 or the speed of the motors 120. Instead, a second prime mover 304, shaft 306, generator device 308, and control unit 310 may be provided. The prime mover 304 may be similar to the prime mover 104, the shaft 306 may be similar to the shaft 106, and the generator device 308 may be similar to the generator device 108. For example, the prime mover 304 may rotate the shaft 306 and the generator device 308 may create an electric current based on this rotation of the shaft 306. Alternatively, a single prime mover 104 or 304 and shaft 106 or 306 may be provided, with the generator devices 108, 308 both coupled with the same shaft 106 or 306 to separately generate electric currents.

The control unit 310 may be similar to the control units 110 and/or 302 in that the control unit 310 may receive a direct current from the generator device 308, modify the current (such as by changing the current to an alternating current and controlling a frequency of the alternating current), and supply the modified current to the traction motors 120 to power the motors 120 and control the speeds of the motors 120, as described above in connection with the control unit 110. In the illustrated embodiment, the generator device 108 and control unit 302 used to power and control the pump motors 112 are separate from the generator device 308 and control unit 310 used to power and control the traction motors 120. The generator device 308 and control unit 310 may be part of a propulsion subsystem of the vehicle 102 that is used to propel the vehicle 102 while the generator device 108 and the control unit 110 is part of the system 300 that is used to power the pump motors 112, as described above.

The system 300 shown in FIG. 3 may be able to power the hydraulic pump 114 to pump relatively large amounts of fluid. For example, a single mobile vehicle 102 having the system 300 disposed onboard the vehicle 102 and coupled with the hydraulic pump 114 may power the pump 114 to pump at least 200 gallons (or 757 liters) of fluid per minute. As another example, a single mobile vehicle 102 having the system 300 disposed onboard the vehicle 102 and coupled with the hydraulic pump 114 may power the pump 114 to pump at least 300 gallons (or 1,135 liters) of fluid per minute. In another embodiment, a single mobile vehicle 102 having the system 300 disposed onboard the vehicle 102 and coupled with the hydraulic pump 114 may power the pump 114 to pump at least 380 gallons (or 1,438 liters) of fluid per minute. Alternatively, a single mobile vehicle 102 having the system 300 disposed onboard the vehicle 102 and coupled with the hydraulic pump 114 may power the pump 114 to pump a different amount of fluid per minute.

Figure 8:
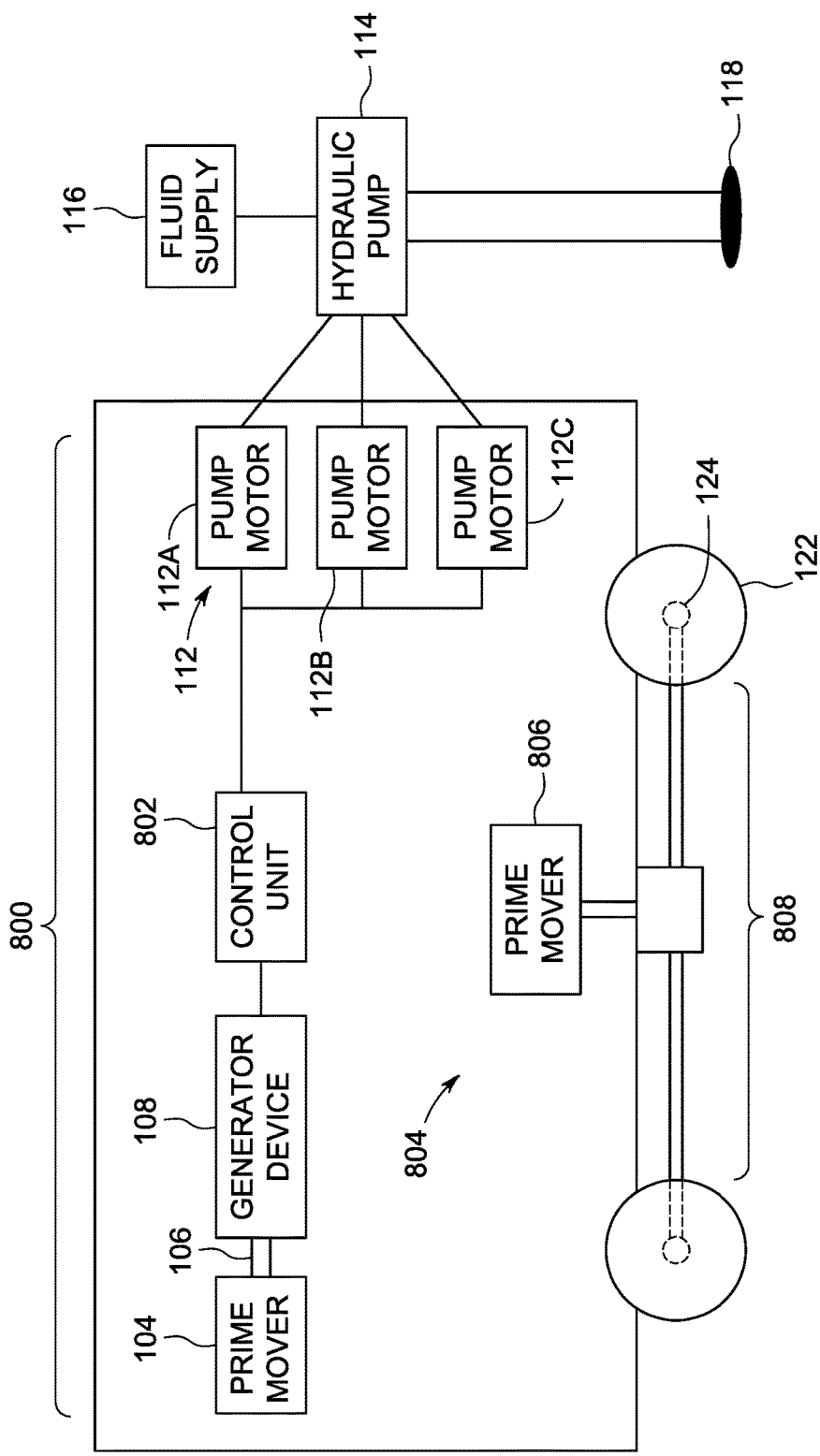
FIG. 8 is a schematic view of another embodiment of a mobile hydraulic pump powering system.

FIG. 8 is a schematic view of another embodiment of a hydraulic pump powering system 800. The system 800 may be similar to the system 100 shown in FIG. 1. For example, the system 800 may be disposed onboard the vehicle 102. In one embodiment, the system 800 is disposed onboard the same vehicle 102 that also includes a propulsion subsystem 804 that acts to propel the vehicle 102. In another embodiment, the system 800 is disposed onboard a trailer or other vehicle that is coupled with the vehicle 102 having the propulsion subsystem 804.

The system 800 may include the prime mover 104, shaft 106, and generator device 108 that are coupled with a control unit 802. The control unit 802 may be similar to the control unit 110 and/or 302 shown in FIGS. 1 and 3 in that the control unit 802 may convert current received from the generator device 108 into a variable frequency alternating current that is supplied to the pump motors 112 for powering the hydraulic pump 114, as described above.

One difference between the system 800 and the system 300 is that the system 800 is used with a vehicle 102 that is not propelled by electric current generated by a prime mover and electric current generator device. For example, the vehicle 102 may include the propulsion subsystem 804 that includes a prime mover 806 that is mechanically interconnected with the wheels 122 and/or axles 124 of the vehicle 102 by a transmission system 808. The transmission system 808 can include mechanical gears 810, shafts 812 (e.g., a driveshaft), and the like, for translating rotary movement created by the prime mover 806 into rotation of the axles 124 and wheels 122 to propel the vehicle 102. The prime mover 806 can represent an engine, such as an internal combustion engine, as one example.

In operation, the prime mover 806 of the propulsion subsystem 804 generates movement that is converted into a propulsive force that propels the vehicle 102. For example, the rotary movement created by the prime mover 806 is mechanically translated (e.g., using gears and the like) into a propulsive force that rotates the wheels 122 to propel the vehicle 102 by the transmission system 808. The movement generated by the prime mover 806 is not used to power the pump motors 112 or the hydraulic pump 114 in the illustrated embodiment. The prime mover 104 of the powering system 800, however, generates movement that is converted into electric energy that is used to power the pump motors 112, which power the hydraulic pump 114, as described above. By keeping the powering system 800 and the propulsion subsystem 804 separate from each other, the powering system 800 may be more easily added to an existing vehicle 102. For example, the powering system 800 may be added to an existing vehicle 102, such as by loading the system 800 onboard a trailer that is pulled by the vehicle 102.

The system 800 shown in FIG. 8 may be able to power the hydraulic pump 114 to pump relatively large amounts of fluid. For example, a single mobile vehicle 102 having the system 800 disposed onboard the vehicle 102 and coupled with the hydraulic pump 114 may power the pump 114 to pump at least 200 gallons (or 757 liters) of fluid per minute. As another example, a single mobile vehicle 102 having the system 800 disposed onboard the vehicle 102 and coupled with the hydraulic pump 114 may power the pump 114 to pump at least 300 gallons (or 1,135 liters) of fluid per minute. In another embodiment, a single mobile vehicle 102 having the system 800 disposed onboard the vehicle 102 and coupled with the hydraulic pump 114 may power the pump 114 to pump at least 380 gallons (or 1,438 liters) of fluid per minute. Alternatively, a single mobile vehicle 102 having the system 800 disposed onboard the vehicle 102 and coupled with the hydraulic pump 114 may power the pump 114 to pump a different amount of fluid per minute.

Figure 4:
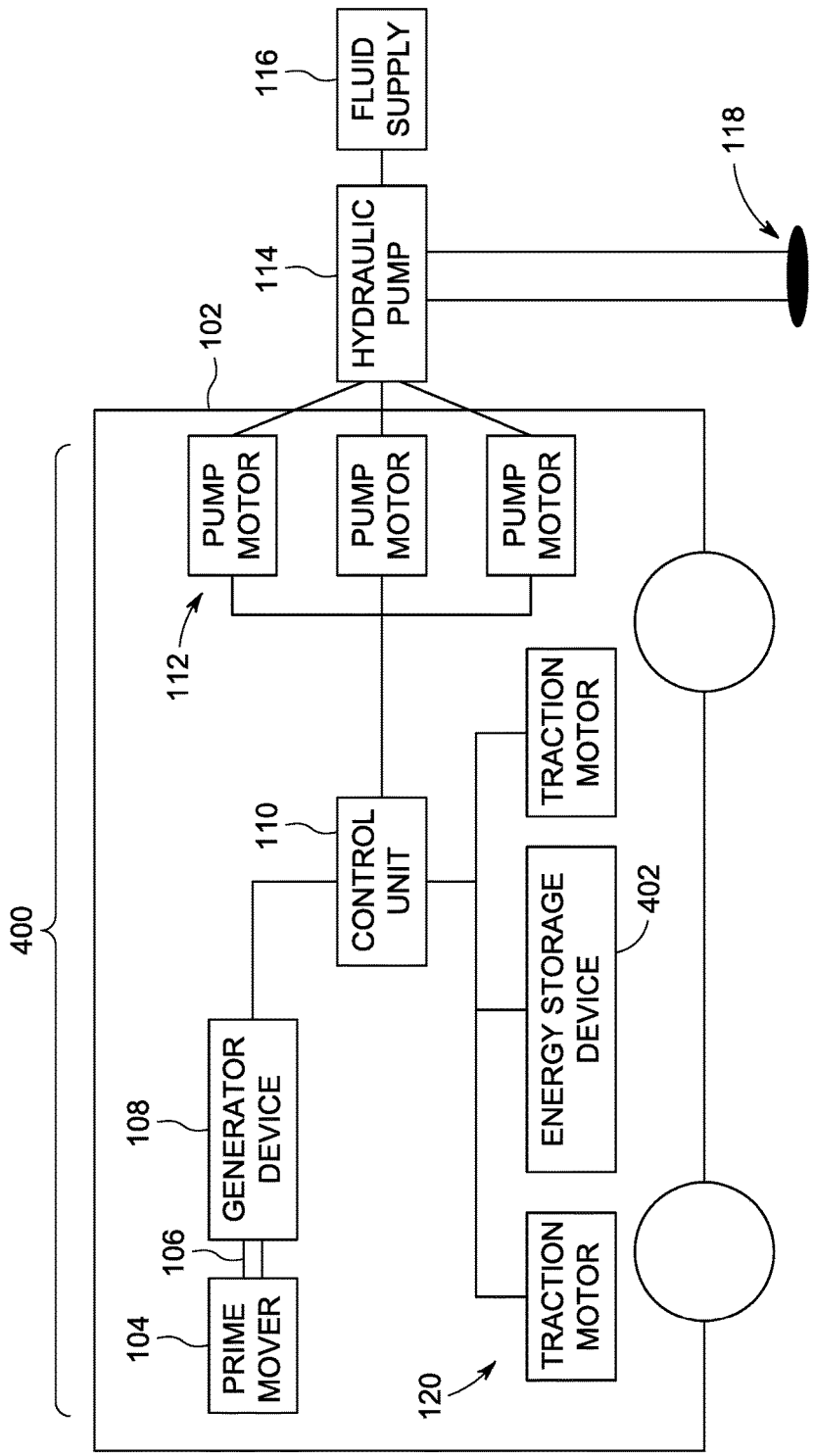
FIG. 4 is a schematic view of another embodiment of a mobile hydraulic pump powering system.

FIG. 4 is a schematic view of another embodiment of a hydraulic pump powering system 400. The system 400 may be similar to the system 100 shown in FIG. 1. For example, the system 400 may be disposed onboard the vehicle 102. Similar to the system 100, the system 400 may include the prime mover 104, shaft 106, and generator device 108 that are coupled with the control unit 110. As described above, the control unit 110 may convert current received from the generator device 108 into a variable frequency alternating current that is supplied to the pump motors 112 for powering the hydraulic pump 114, as described above. The control unit 110 also may provide the alternating current to the traction motors 120 for propelling the vehicle 102. Alternatively, another propulsion subsystem of the vehicle 102 may power the traction motors 120, as described above in connection with FIG. 3.

The system 400 shown in FIG. 4 may be able to power the hydraulic pump 114 to pump relatively large amounts of fluid. For example, a single mobile vehicle 102 having the system 400 disposed onboard the vehicle 102 and coupled with the hydraulic pump 114 may power the pump 114 to pump at least 200 gallons (or 757 liters) of fluid per minute. As another example, a single mobile vehicle 102 having the system 400 disposed onboard the vehicle 102 and coupled with the hydraulic pump 114 may power the pump 114 to pump at least 300 gallons (or 1,135 liters) of fluid per minute. In another embodiment, a single mobile vehicle 102 having the system 400 disposed onboard the vehicle 102 and coupled with the hydraulic pump 114 may power the pump 114 to pump at least 380 gallons (or 1,438 liters) of fluid per minute. Alternatively, a single mobile vehicle 102 having the system 400 disposed onboard the vehicle 102 and coupled with the hydraulic pump 114 may power the pump 114 to pump a different amount of fluid per minute.

One difference between the system 400 of FIG. 4 and the system 100 of FIG. 1 is that the system 400 includes an onboard energy storage device 402. The energy storage device 402 may include a battery, flywheel, capacitor, fuel cell, and the like, that stores energy for powering one or more loads of the vehicle 102. For example, the energy storage device 402 may provide electric current to the traction motors 120 to power the traction motors 120 and propel the vehicle 102 and/or to the pump motors 112 to power the hydraulic pump 114 or pumps 114.

The control unit 110 may output the variable frequency alternating current to the energy storage device 402 and the energy storage device 402 may modify the alternating current for storage in the device 402. For example, the energy storage device 402 may convert the alternating current to a direct current for storage in the device 402. Alternatively, the control unit 110 may output a direct current to the energy storage device 402 instead of an alternating current.

The energy storage device 402 may be used to power one or more of the pump motors 112. For example, instead of using electric current generated by the generator device 108 from movement created the prime mover 104 to power the pump motors 112, the energy storage device 402 may power the pump motors 112. Alternatively, the energy storage device 402 may supplement the current that is supplied to the pump motors 112 from the generator device 108 so that the pump motors 112 receive additional electric current above the electric current that is obtained from the generator device 108. The energy storage device 402 can supply direct current to the control unit 110, which may convert the direct current into a variable frequency alternating current, as described above. For example, the direct current that is supplied from the energy storage device 402 to the control unit 110 may be received similar to the direct current that is received from the generator device 108. The direct current may be modified into an alternating current, then changed into a direct current, and then modified into the variable frequency alternating current that is supplied to the pump motors 112, as described above. Additionally or alternatively, the energy storage device 402 may power one or more of the traction motors 120 to supplement or replace the electric current provided from the generator device 108.

The electric current that is output from the control unit 110 may be used to charge the energy storage device 402. Additionally or alternatively, the energy storage device 402 may be charged using one or more regenerative techniques, such as by regenerating energy from braking of the vehicle using the traction motors and charging the energy storage device 402 with this energy. In one embodiment, the control unit 110 may apply a cyclic loading technique that involves cycling between directing the electric current to the energy storage device 402 and one or more of the pump motors 112 and/or traction motors 110 at different time periods.

In one embodiment, the electric current that is output by the control unit 110 also is used to power one or more other electric loads, such as auxiliary loads of the vehicle. An "auxiliary load" includes an electric load that consumes electric current to perform work other than propelling the vehicle. Examples of such loads include, but are not limited to, radiator blowers, air compressors, air conditioners, power steering, power brakes, and the like. Other examples of such loads can include equipment that mixes the fluid that is pumped by the system, such as a fracking fluid blender.

As shown in FIGS. 1 through 4, the powering system that generates, converts, and supplies electric energy to the pump motors 112 for powering the hydraulic pump 114 may be disposed onboard the vehicle 102. For example, the prime mover, shaft, generator device, control unit, and pump motors 112 all may be disposed onboard the same vehicle 102. Alternatively, two or more of the components of the powering system may be disposed on different vehicles 102 and connected by one or more conductors (e.g., cables) or conduits (e.g., manifolds).

Figure 5:
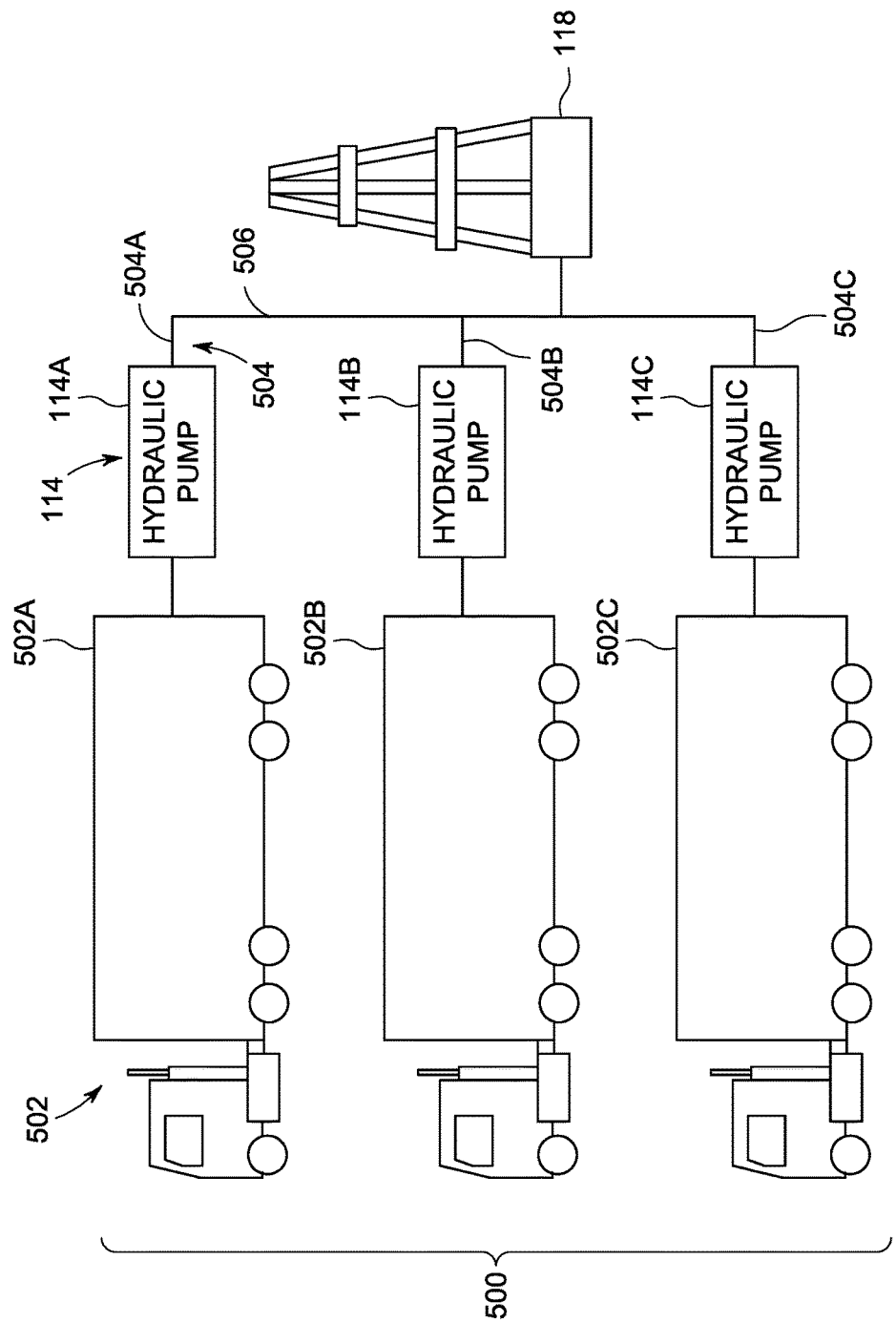
FIG. 5 illustrates one embodiment of a scalable mobile hydraulic pump powering system.

FIG. 5 illustrates one embodiment of a scalable hydraulic pump powering system 500. The system 500 may be similar to one or more of the powering systems 100, 300, 400 shown in FIGS. 1, 3, and 4. For example, the system 500 may be used to generate and/or convert electric energy (e.g., current) for powering electric pump motors (e.g., motors 112 shown in FIG. 1) that power hydraulic pumps 114 (e.g., the pumps 114A-C). While three vehicles 502 are shown in FIG. 5, alternatively, two vehicles 502 or more than three vehicles 502 may be provided.

Similar to the systems 100, 300, 400, the system 500 may include one or more prime movers, generator devices, and control units that operate to create and/or modify electric current to power the pump motors 112 (shown in FIG. 1) that are mechanically coupled with the hydraulic pumps 114 to cause the hydraulic pumps 114 to direct pressurized fluids into the pumping location 118. For example, each vehicle 502 shown in FIG. 5 may represent the vehicle 102, 302, and/or 402 (shown in FIGS. 1, 3, and 4). The vehicles 502 may separately drive (e.g., power) different hydraulic pumps 114. For example, the vehicle 502A may generate electric current that powers onboard pump motors 112 (shown in FIG. 1) on the vehicle 502A that power the hydraulic pump 114A to pump pressurized fluid through one or more conduits 504 (e.g., conduits 504A) that are fluidly coupled with a manifold 506. The vehicles 502B, 502C may similarly power onboard pump motors 112 of the vehicles 502B, 502C that power the hydraulic pumps 114B, 114C to pump additional pressurized fluid through conduits 504 (e.g., conduits 504B, 504C) that also are fluidly coupled with the manifold 506.

The manifold 506 directs the pressurized fluids that are pumped from the hydraulic pumps 114A-C into the pumping location 118. For example, the manifold 506 can combine the pressurized fluids that are separately pumped by the vehicles 502 and the hydraulic pumps 114 before directing the combined pressurized fluids into the pumping location 118. The combined volume and/or flow of the fluids that are pumped by the vehicles 502 and the hydraulic pumps 114 into the manifold 506 may be greater than the volume and/or flow of the fluids that are pumped by a single combination of a vehicle 502 and hydraulic pump 114 and/or by a fewer number of vehicles 502 and/or pumps 114. For example, the volume and/or pressure of the pumped fluid may be greater when several vehicles 502 separately power the hydraulic pumps 114 that are fluidly coupled with each other. The capacity of the vehicles 502 and hydraulic pumps 114 to pump greater amounts and/or flows of fluids into the pumping location 118 can be increased by fluidly coupling additional hydraulic pumps 114 to the manifold 506 (where the hydraulic pumps 114 are powered by additional or the same vehicles 502).

Figure 6:
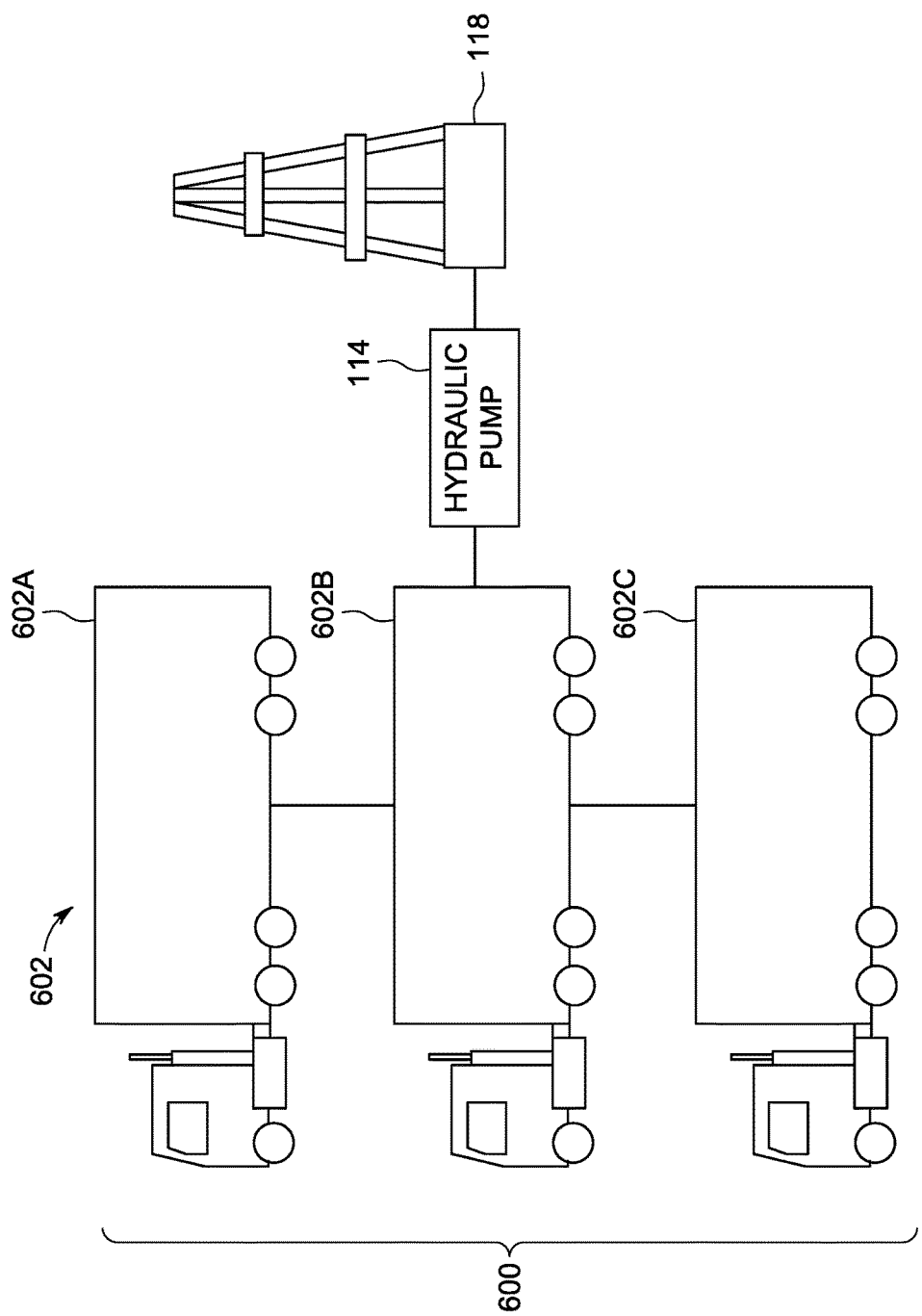
FIG. 6 illustrates one embodiment of a distributed mobile hydraulic pump powering system.

FIG. 6 illustrates one embodiment of a distributed hydraulic pump powering system 600. The system 600 may be similar to one or more of the powering systems 100, 300, 400, 500 shown in FIGS. 1, 3, 4, and 5. The system 600 may be used to generate and/or convert electric energy (e.g., current) for powering electric pump motors (e.g., motors 112 shown in FIG. 1) that power one or more hydraulic pumps 114. In contrast to the systems 100, 300, 400, 500, the system 600 is distributed among plural vehicles 602 (e.g., the vehicles 602A-C). For example, not all of the components that generate electric current, modify the electric current, and/or use the electric current to power the hydraulic pump 114 may be disposed onboard a single vehicle. Instead, the components may be distributed among several vehicles 602.

As one example, the power generating components that generate the electric current (e.g., the prime mover 104 and the generator device 108 shown in FIG. 1, the energy storage device 402 shown in FIG. 4, and the like) may be disposed onboard the first vehicle 602A. The power transmission components that transmit (e.g., modify and/or control) the electric current (e.g., the control unit 110 shown in FIG. 1)

may be disposed on a separate vehicle 602C. The pump components that power the hydraulic pump 114 (e.g., the pump motors 112 shown in FIG. 1) may be disposed on another separate vehicle 602B. Alternatively, the components may be distributed differently and/or among other vehicles 602. By "separate," it is meant that the components may be located onboard the vehicles 602 that are not mechanically coupled with each other such that the vehicles 602 may independently propel themselves to the pumping location 118, where the components may then be electrically and/or fluidly coupled with each other.

One or more of the vehicles 602 in the system 600 may be located relatively far from one or more other vehicles 602 in the system 600 during operation. For example, the first vehicle 602A may be located between two or more pumping locations separated by a significant distance, such as a mile (or 1.6 kilometers) or more from each other. Alternatively, the pumping locations may be separated by a smaller or larger distance. Different groups of vehicles 602B, 602C may be located at these separated pumping locations to receive electric energy from the vehicle 602A to power the hydraulic pumps 114 at each of the pumping locations.

In one embodiment, one or more of the vehicles 602 may be standby or backup vehicles 602 that include additional components of the powering systems disclosed herein for use in the event that one or more components of the powering system used to power the hydraulic pump 114 fails or needs to be replaced. For example, a vehicle 602 may include backup pump motors 112 that can be connected with the output of the control unit 110 on another vehicle 602 in the event that other pump motors 112 on another vehicle 602 fail or otherwise stop working. Alternatively, the standby or backup vehicles 602 may carry one or more other standby or backup components, such as a backup prime mover, generator device, and/or control unit.

Figure 7:
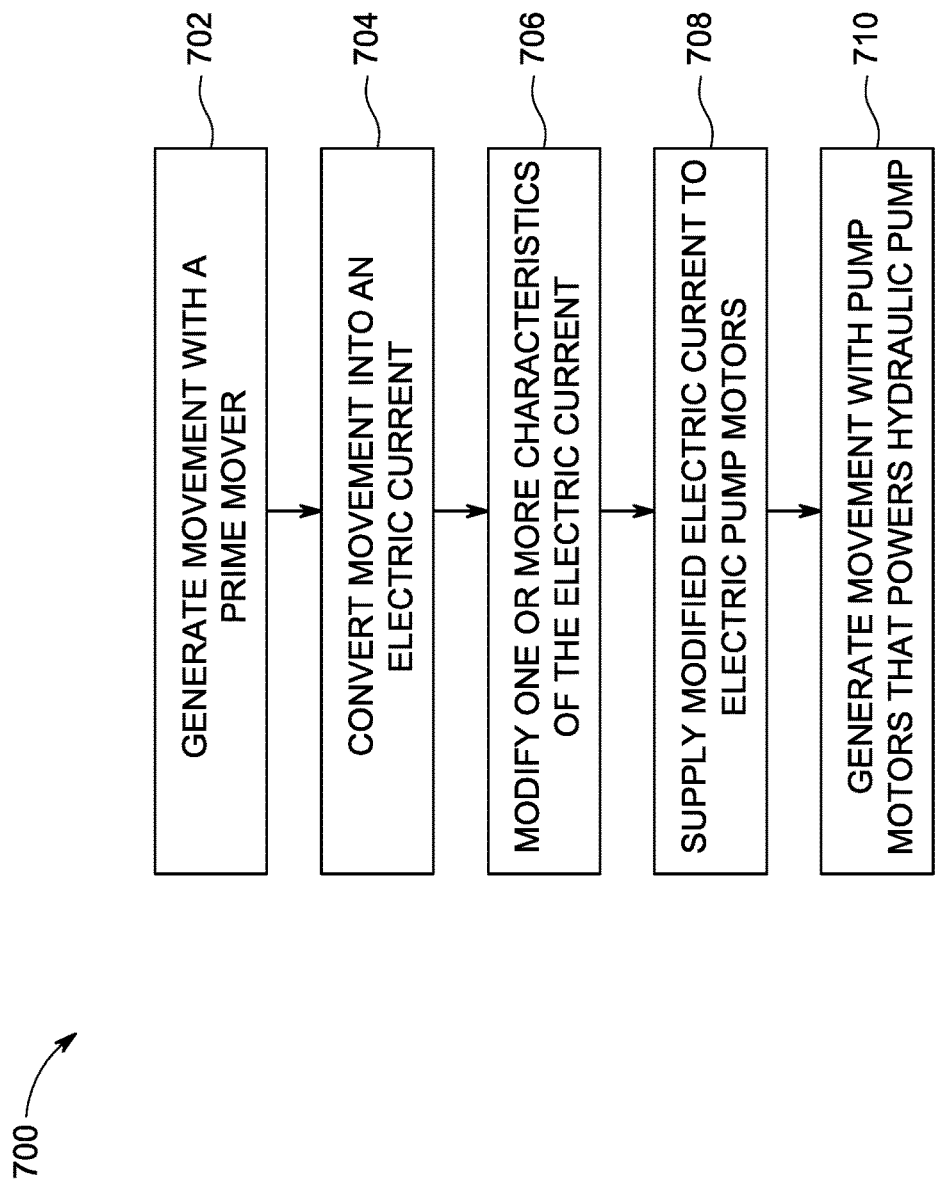
FIG. 7 is a flowchart of one embodiment of a method for electrically powering a hydraulic pump.

FIG. 7 is a flowchart of one embodiment of a method 700 for electrically powering a hydraulic pump. The method 700 may be used in conjunction with one or more embodiments of the systems 100, 300, 400, 500, 600 shown in FIGS. 1 and 3-6. At 702, movement is generated by a prime mover. For example, an engine, turbine, or other device may generate movement such as rotation of a shaft.

At 704, the movement generated by the prime mover is converted into an electric current. For example, an alternator or generator may be coupled with the shaft that is moved by the prime mover. The alternator can create an alternating current or the generator can create a direct current from the rotation of the shaft by the prime mover.

At 706, one or more characteristics of the electric current are modified. For example, the voltage of the current may be increased (e.g., stepped up) or decreased (e.g., stepped down). As another example, the direct current may be changed into an alternating current. The frequency and/or phase of the alternating current can be controlled based on manual input or may be automatically controlled, as described above.

At 708, the modified electric current is supplied to electric pump motors. The electric current powers the pump motors. For example, the electric current can power the motors to generate rotary movement of an object, such as a shaft, axle, or the like. As described above, the frequency of the alternating current that is supplied to the pump motors can be varied to control the speed at which the pump motors operate.

At 710, the movement that is created by the pump motors generates movement of a hydraulic pump. For example, the shaft, axle, or other component that is rotated by one or more electric pump motors can be connected with the hydraulic pump such that the hydraulic pump uses the rotation to pump fluid (e.g., fracking fluid, slurry, cement, or the like) into a pumping location.

In another embodiment, another hydraulic pump powering system includes a mobile vehicle, a first electric current generator device, and one or more electric pump motors. The mobile vehicle has first and second prime movers. The first electric current generator device is disposed onboard the mobile vehicle and is configured to be mechanically coupled with the first prime mover to convert movement created by the first prime mover into first electric current. The one or more electric pump motors are configured to receive the first electric current to power a hydraulic pump. The second prime mover is configured to generate movement that is converted into a propulsive force that propels the mobile vehicle. The one or more electric pump motors are configured to receive the first electric current in order to power the hydraulic pump to pump a fluid into a pumping location located off-board the mobile vehicle.

In one aspect, the first prime mover is configured to generate more than 2500 horsepower of power to generate the first electric current using the first electric current generator device.

In one aspect, the first prime mover is configured to generate more than 2750 horsepower of power to generate the first electric current using the first electric current generator device.

In one aspect, the first prime mover is configured to generate more than 3000 horsepower of power to generate the first electric current using the first electric current generator device.

In one aspect, the first prime mover is configured to generate more than 3500 horsepower of power to generate the first electric current using the first electric current generator device.

In one aspect, the system also includes a second electric current generator device and one or more electric traction motors. The second electric current generator device is disposed onboard the mobile vehicle and is configured to be mechanically coupled with the second prime mover to convert movement created by the second prime mover into second electric current. The one or more electric traction motors are configured to be powered by the second electric current to generate the propulsive force that propels the mobile vehicle.

In one aspect, the one or more electric pump motors are configured to be powered by the first electric current to generate movement that powers the hydraulic pump without being mechanically coupled with the first prime mover by one or more gears and/or transmissions.

In one aspect, the first electric current generator device includes an alternator configured to convert the movement created by the first prime mover into an alternating electric current.

In one aspect, at least one of the first or second prime movers comprises at least one of an engine or a turbine.

In one aspect, the system also includes a control unit disposed onboard the mobile vehicle and configured to control a frequency of the first electric current in order to control a speed at which the one or more electric pump motors operate.

In one aspect, the control unit is configured to convey at least a portion of the first electric current to an energy storage device of the vehicle that also powers the one or more traction motors of the mobile vehicle that are powered to provide the propulsive force that propels the mobile vehicle.

In one aspect, the control unit includes an alternator configured to convert the first electric current received from the first electric current generator device into a direct current, an inverter configured to convert the direct current into an alternating current, and a variable frequency drive (VFD) device configured to modify a frequency of the alternating current to form a modified electric current that is supplied to the one or more electric pump motors.

In one aspect, the VFD device is configured to modify the frequency of the alternating current in order to control a speed at which the one or more electric pump motors operate.

In one aspect, the one or more electric pump motors include one or more traction motors that also are configured to be coupled with one or more wheels or axles of the mobile vehicle to propel the mobile vehicle.

In one aspect, the one or more electric pump motors include at least one of an alternating current induction motor, a permanent magnet motor, a switched reluctance motor, or a direct current motor.

In one aspect, the one or more electric pump motors are configured to power the hydraulic pump to pump fracturing fluid into a drill site at the pumping location.

In another embodiment, another hydraulic pump powering system includes a mobile vehicle, an electric current generator device, a control unit, one or more electric traction motors, and one or more electric pump motors. The mobile vehicle includes a prime mover. The electric current generator device is disposed onboard the mobile vehicle and is mechanically coupled with the prime mover. The electric current generator device is configured to convert movement of the prime mover into a first electric current. The control unit is disposed onboard the mobile vehicle and is configured to convert the first electric current from the electric current generator device into a modified electric current. The one or more electric traction motors are coupled with at least one of axles or wheels of the mobile vehicle. The one or more electric traction motors are configured to propel the mobile vehicle. The one or more electric pump motors are disposed onboard the mobile vehicle and are configured to power a hydraulic pump to pump a fluid into a pumping location disposed off-board the mobile vehicle. The control unit is configured to control when the modified electric current is supplied to the one or more electric traction motors to propel the mobile vehicle and when the modified electric current is supplied to the one or more electric pump motors to power the hydraulic pump.

In one aspect, the one or more electric pump motors are configured to be powered by the modified electric current to generate movement that powers the hydraulic pump without being mechanically coupled with the prime mover by one or more gears and/or transmissions.

In one aspect, the electric current generator device includes an alternator configured to convert the movement created by the prime mover into the first electric current, and the first electric current includes an alternating electric current.

In one aspect, the prime mover comprises at least one of an engine or a turbine, and wherein the electric current generator device is configured to be coupled with a shaft connected to the prime mover to convert rotation of the shaft by the at least one of the engine or the turbine into the first electric current.

In one aspect, the control unit is configured to control a frequency of the first electric current to create the modified electric current in order to control a speed at which the one or more electric pump motors operate.

In one aspect, the control unit is configured to convey at least a portion of the modified electric current to an energy storage device disposed onboard the mobile vehicle that also powers the one or more traction motors.

In one aspect, the one or more electric pump motors are configured to power the hydraulic pump to pump fracturing fluid into a drill site at the pumping location.

In another embodiment, another hydraulic pump powering system includes a mobile vehicle, an electric current generator device, one or more electric pump motors, one or more electric traction motors, and a control unit. The electric current generator device is mechanically coupled with a prime mover of the mobile vehicle to generate electric current. The one or more electric pump motors are disposed on board the mobile vehicle and are configured to receive the electric current and to power a hydraulic pump using the electric current. The one or more electric traction motors are disposed on board the mobile vehicle and are configured to receive the electric current to propel the mobile vehicle. The control unit is disposed onboard the mobile vehicle and is configured to control a frequency of the electric current that is supplied to the one or more electric pump motors in order to control flow of a fluid that is pumped into a pumping location disposed off-board of the mobile vehicle by the hydraulic pump.

In another embodiment, a method (e.g., for powering a hydraulic pump) includes converting movement of a prime mover disposed onboard a mobile vehicle into an electric current, directing the electric current to one or more electric traction motors of the mobile vehicle to propel the mobile vehicle during a first time period, and directing the electric current to one or more electric pump motors disposed onboard the mobile vehicle to power the hydraulic pump disposed off-board the mobile vehicle during a second time period. The electric current is directed to the one or more electric pump motors to pump a fluid into a pumping location that is disposed off-board the mobile vehicle.

In one aspect, converting the movement of the prime mover into the first electric current includes creating an alternating current from rotation of a shaft connected to the prime mover that comprises at least one of an engine or a turbine.

In one aspect, the method also includes modifying a frequency of the electric current to control a speed at which the one or more electric pump motors operate.

In one aspect, the method also includes directing the electric current to an energy storage device disposed onboard the mobile vehicle that also powers the one or more traction motors.

In one aspect, directing the electric current to the one or more electric pump motors includes powering the hydraulic pump to pump fracturing fluid into a drill site at the pumping location.

In one aspect, the first and second time periods are non-overlapping time periods.

In another embodiment, another hydraulic pump powering system includes a mobile vehicle, an electric current generator device, a control unit, and one or more electric pump motors. The mobile vehicle has a gas turbine disposed onboard the mobile vehicle. The electric current generator device is on board the vehicle and is mechanically coupled with the gas turbine to convert movement created by the gas turbine into electric current. The control unit is configured to receive the electric current and to modify the electric current into a modified current. The one or more electric pump motors are on board the vehicle and are configured to receive the modified current. The control unit is configured to output the modified current for powering the one or more electric pump motors to power at least one hydraulic pump to pump hydraulic fracturing fluid into a pumping location located off-board the mobile vehicle.

In one aspect, the gas turbine is powered by natural gas.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
    an electric current generator device configured to be disposed onboard a self-propelling mobile vehicle having a prime mover and one or more electric traction motors, the electric current generator device configured to be mechanically coupled with the prime mover, the electric current generator device configured to convert movement of the prime mover into a first electric current;
    a control unit configured to be disposed onboard the self-propelling mobile vehicle and to convert the first electric current from the electric current generator device into a modified electric current;
    one or more electric pump motors configured to be disposed onboard the self-propelling mobile vehicle and configured to power a hydraulic pump disposed off-board the self-propelling mobile vehicle to pump a fluid into a pumping location located off-board the self-propelling mobile vehicle,
    wherein the control unit is configured to control when the modified electric current is supplied to the one or more electric traction motors to propel the self-propelling mobile vehicle and when the modified electric current is supplied to the one or more electric pump motors to power the hydraulic pump.

2. The system of claim 1, wherein the one or more electric pump motors are configured to be powered by the modified electric current to generate movement that powers the hydraulic pump without being mechanically coupled with the prime mover by one or more gear or transmission.

3. The system of claim 1, wherein the electric current generator device includes an alternator configured to convert the movement created by the prime mover into the first electric current, wherein the first electric current comprises an alternating electric current.

4. The system of claim 1, wherein the prime mover comprises at least one of an engine or a turbine, and wherein the electric current generator device is configured to be coupled with a shaft connected to the prime mover to convert rotation of the shaft by the at least one of the engine or the turbine into the first electric current.

5. The system of claim 1, wherein the control unit is configured to control a frequency of the first electric current to create the modified electric current in order to control a speed at which the one or more electric pump motors operate.

6. The system of claim 1, wherein the control unit is configured to convey at least a portion of the modified electric current to an energy storage device disposed onboard the mobile vehicle that also powers the one or more traction motors.

7. The system of claim 1, wherein the one or more electric pump motors are configured to power the hydraulic pump to pump fracturing fluid into a drill site at the pumping location.

8. A system comprising:
an electric current generator device configured to be mechanically coupled with a prime mover of a mobile vehicle having one or more electric traction motors, the electric current generator device configured to generate first electric energy having a first electric characteristic;
one or more electric pump motors configured to be disposed onboard the mobile vehicle; and
a control unit configured to be disposed onboard the mobile vehicle, wherein the control unit is further configured to convert the first electric energy from the generator into second electric energy having a different, second electric characteristic, the one or more electric pump motors further configured to receive the second electric energy and to power a hydraulic pump using the second electric energy, and the control unit further configured to control a frequency of the second electric energy that is supplied to the one or more electric pump motors in order to control flow of a fluid that is pumped into a pumping location located off-board of the mobile vehicle by the hydraulic pump, and the control unit is further configured to convert the first electric energy from the generator into third electric energy having a different, third electric characteristic for supply to the one or more electric traction motors, the third electric characteristic configured for powering the one or more electric traction motors to propel the mobile vehicle.

9. A method comprising:
converting movement of a prime mover disposed onboard a mobile vehicle into an electric current;
directing the electric current to one or more electric traction motors of the mobile vehicle to propel the mobile vehicle during a first time period; and
directing the electric current to one or more electric pump motors disposed onboard the mobile vehicle to power a hydraulic pump disposed off-board the mobile vehicle during a second time period, wherein the electric current is directed to the one or more electric pump motors to pump a fluid into a pumping location that is located off-board the mobile vehicle.

10. The method of claim 9, wherein converting the movement of the prime mover into the first electric current includes creating an alternating current from rotation of a shaft connected to the prime mover that comprises at least one of an engine or a turbine.

11. The method of claim 9, further comprising modifying a frequency of the electric current to control a speed at which the one or more electric pump motors operate.

12. The method of claim 9, further comprising directing the electric current to an energy storage device disposed onboard the mobile vehicle that also powers the one or more traction motors.

13. The method of claim 9, wherein directing the electric current to the one or more electric pump motors includes powering the hydraulic pump to pump fracturing fluid into a drill site at the pumping location.

14. The method of claim 9, wherein the first and second time periods are non-overlapping time periods.

15. A system comprising:
an electric current generator device configured to be onboard a mobile vehicle and mechanically coupled with a prime mover of the vehicle to convert movement created by the prime mover into electric current;
a control unit configured to receive the electric current and to modify the electric current into a first modified current;
one or more electric pump motors configured to be onboard the vehicle and configured to receive the first modified current, wherein the control unit is configured to output the first modified current at a power level of at least 700 kilowatts for powering the one or more electric pump motors; and
one or more electric traction motors configured to be onboard the vehicle, wherein the control unit is further configured to modify the electric current into a different, second modified current, the one or more electric traction motors further configured to receive the second modified current for operating to propel the mobile vehicle;
wherein the one or more electric pump motors are configured generate mechanical power in excess of 2500 horsepower (HP) for powering at least one hydraulic pump to pump hydraulic fracturing fluid into a pumping location located off-board the mobile vehicle at a rate of at least 2 gallons per minute per revolution of the at least one hydraulic pump.

16. The system of claim 15, wherein the control unit is configured to output the first modified current at a voltage of at least 400 volts for powering the one or more electric pump motors.

17. The system of claim 15, wherein the electric current generator device, the control unit, and the one or more electric pump motors disposed on the mobile vehicle are configured to power the at least one hydraulic pump to pump at least 200 gallons per minute.

18. The system of claim 15, wherein the first modified current is direct current, and the second modified current is alternating current.

19. The system of claim 15, wherein control unit is configured to output the first modified current for powering the one or more electric pump motors during a first time period, and to output the second modified current for powering the one or more traction motors during a second time period that non-overlaps with the first time period.

20. The system of claim 8, wherein control unit is configured to output the second electric energy for powering the one or more electric pump motors during a first time period, and to output the third electric energy for powering the one or more traction motors during a second time period that non-overlaps with the first time period.

* * * * *